US009805217B2

(12) United States Patent
Brandt et al.

(10) Patent No.: US 9,805,217 B2
(45) Date of Patent: *Oct. 31, 2017

(54) DEVICE LOCATION HISTORY ANONYMIZATION BASED ON STOP DECISION (71) Applicant: Google Inc., Mountain View, CA (US)

(72) Inventors: Eli Brandt, Seattle, WA (US); Stephen David Zelinka, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,259

(22) Filed: Oct. 31, 2016

(65) Prior Publication Data
US 2017/0046534 A1 Feb. 16, 2017

Related U.S. Application Data (63) Continuation of application No. 14/876,478, filed on Oct. 6, 2015, now Pat. No. 9,491,616, which is a
(Continued)

(51) Int. Cl.
G06F 7/04 (2006.01)
G06F 21/62 (2013.01)
(Continued)

(52) U.S. Cl.
CPC .......... *G06F 21/6254* (2013.01); *G06F 21/14* (2013.01); *G06F 21/6245* (2013.01);
(Continued)

(58) Field of Classification Search
CPC .................. H04M 2201/36; H04W 4/028
(Continued)

(56) References Cited

U.S. PATENT DOCUMENTS 6,104,338 A * 8/2000 Krasner ................. G01S 19/41
342/357.24
6,140,338 A 10/2000 Naya et al.
(Continued)

OTHER PUBLICATIONS

Office Action for U.S. Appl. No. 14/030,965, dated Feb. 4, 2015, 10 pages.
(Continued)

*Primary Examiner* — Kiet Doan
(74) *Attorney, Agent, or Firm* — McDonnell Boehnen Hulbert & Berghoff LLP (57) ABSTRACT Embodiments described herein may help to protect users' privacy when storing and/or utilizing location data that is provided by the users' mobile devices. An example method may involve: (a) determining a location history associated with a first client device, wherein the location history comprises a plurality of time-stamped location reports associated with the first client device, (b) before the location history is exported: (i) identifying at least one stop in the location history, wherein the at least one stop corresponds to a plurality of location reports that indicate a substantial lack of movement by the first client device, and (ii) scrubbing the location history in order to obscure at least one location report that corresponds to the at least one stop, and (c) exporting the scrubbed location history to long-term data storage.

20 Claims, 7 Drawing Sheets

Related U.S. Application Data continuation of application No. 14/030,965, filed on Sep. 18, 2013, now Pat. No. 9,179,304.

(51) Int. Cl.
*H04W 12/02* (2009.01)
*H04W 4/02* (2009.01)
*G06F 21/14* (2013.01)
*G06F 21/64* (2013.01)
*H04L 29/08* (2006.01)
*H04W 8/16* (2009.01)

(52) U.S. Cl.
CPC .............. *G06F 21/64* (2013.01); *H04L 67/22* (2013.01); *H04W 4/02* (2013.01); *H04W 4/027* (2013.01); *H04W 4/028* (2013.01); *H04W 8/16* (2013.01); *H04W 12/02* (2013.01); *G06F 2221/2151* (2013.01)

(58) Field of Classification Search
USPC ........... 455/456.2, 456.5, 456.3, 456.1, 63.1; 345/156
See application file for complete search history.

(56) References Cited

U.S. PATENT DOCUMENTS

| | | | |
|---|---|---|---|
| 7,120,449 B1* | 10/2006 | Muhonen | G01S 5/02 455/456.1 |
| 8,480,596 B2 | 7/2013 | Jacobs | |
| 2006/0183426 A1* | 8/2006 | Graves | A61N 1/08 455/63.1 |
| 2007/0296581 A1 | 12/2007 | Schnee et al. | |
| 2009/0096686 A1 | 4/2009 | Niculescu et al. | |
| 2013/0122935 A1 | 5/2013 | Das et al. | |

OTHER PUBLICATIONS

Notice of Allowance for U.S. Appl. No. 14/030,965, dated Jul. 15, 2015, 9 pages.

* cited by examiner

DEVICE LOCATION HISTORY ANONYMIZATION BASED ON STOP DECISION

CROSS-REFERENCE TO RELATED APPLICATION

This application is a continuation of pending co-owned U.S. patent application Ser. No. 14/876,478, filed on Oct. 6, 2015, which is a continuation of U.S. patent application Ser. No. 14/030,965, filed on Sep. 18, 2013, both of which are incorporated herein by reference in their entirety and for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

To facilitate more intelligent and useful services and applications, mobile devices such as tablets, mobile phones, and/or laptop computers may be configured to periodically send location data to a service provider. The service provider may then aggregate and store the location data to improve its location-based services.

In order to associate location data with a mobile device, a mobile device may obtain and use an identifying code (e.g., a cryptographically strong hash), which is referred to as a "Client ID." The Client ID allows for location-data reports that come from the same device to be associated with one another. Accordingly, a mobile device may include its Client ID when in each location-data report that it sends. Further, each location-data report sent by a given device may include a timestamp, location data indicative of the device's location at the time indicated by the timestamp, and/or other information related to the device at the time indicated by the timestamp.

SUMMARY

Disclosed herein are methods and systems that relate to protection of user privacy when keeping records of location data. In an example embodiment, a device's location reports may be time-stamped and stored initially in a quarantine system. The location reports may only be stored in quarantine for a short period of time (e.g., seven days), before being exported to long-term storage. However, before exporting the location reports for a given device, which collectively may be referred to as the device's location history, an example method may be used to detect "stops" in the location history, and to scrub the location history around the stops such that the stops are not detectable (or at least less detectable) in the location reports that are exported to long-term storage.

For example, when a user's device sends periodic location reports, clusters of location reports may occur at locations where the user stops for extended periods, such as the user's home or workplace. Accordingly, some or all location reports that geographically and/or temporally near such stop locations may be scrubbed (e.g., removed) from the location history before it is exported to long-term storage.

In one aspect, a method involves: (a) determining, by a computing device, a location history associated with a first client device, wherein the location history comprises a plurality of time-stamped location reports associated with the first client device; (b) before the location history is exported, the computing device: (i) identifying at least one stop in the location history, wherein the at least one stop corresponds to a plurality of location reports that indicate a substantial lack of movement by the first client device and (ii) scrubbing the location history in order to obscure at least one location report that corresponds to the at least one stop; and (c) exporting the scrubbed location history to long-term data storage.

In another aspect, a non-transitory computer readable medium has stored therein instructions executable by a computing device to cause the computing device to perform functions comprising: (a) determining a location history associated with a first client device, wherein the location history comprises a plurality of time-stamped location reports associated with the first client device; (b) before the location history is exported: (i) identifying at least one stop in the location history, wherein the at least one stop corresponds to a plurality of location reports that indicate a substantial lack of movement by the first client device and (ii) scrubbing the location history in order to obscure at least one location report that corresponds to the at least one stop; and (c) exporting the scrubbed location history to long-term data storage.

In a further aspect, a system may include: (a) one or more communication interfaces, wherein at least one communication interface is configured to receive location reports that are generated by a plurality of client devices, wherein received location reports are initially stored in a quarantine system; (b) a location-history module configured to determine, from the location reports stored in the quarantine system, a location history associated with a first client device, wherein the location history comprises a plurality of location reports that are associated with the first client device; and (c) a scrubber module configured to: (i) analyze the location history to identify any stops in the location history, wherein each identified stop corresponds to a plurality of location reports that indicate a substantial lack of movement by the first client device and (ii) scrub the location history to obscure at least one location report that corresponds each stop that is identified in the location history. Further, at least one of the one or more communication interfaces may be configured to export the scrubbed location history to long-term data storage.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A location-based service provider may implement a system to receive and aggregate location-data reports from mobile devices and provide further privacy functions. For example, incoming location-data reports may be sent to a quarantine system (which may also be referred to simply as "quarantine"). Access to the quarantine system may be restricted according to a privacy policy, which helps prevent unauthorized use of location data. Further, a maximum storage period is defined for quarantine, such that location data cannot be kept in quarantine beyond this maximum period.

Before the maximum storage period for location data elapses, location data may be exported from the quarantine system to longer-term storage. For example, location data may be exported to one or more location-data repositories that store location data for longer periods of time (and possibly even indefinitely).

However, according to an example embodiment, a quarantine-scrubber process may be implemented to "scrub" all location data that is exported out of quarantine, before the data is stored in long-term storage. Such a process may involve various techniques to remove or further obscure location data that is exported out of quarantine to such location-data repositories, and help prevent identification of the users of client devices that provide the location data. For instance, an example quarantine-scrubber process may help to protect user privacy by scrubbing around "stops" in location data from a given client device.

Figure 1A:
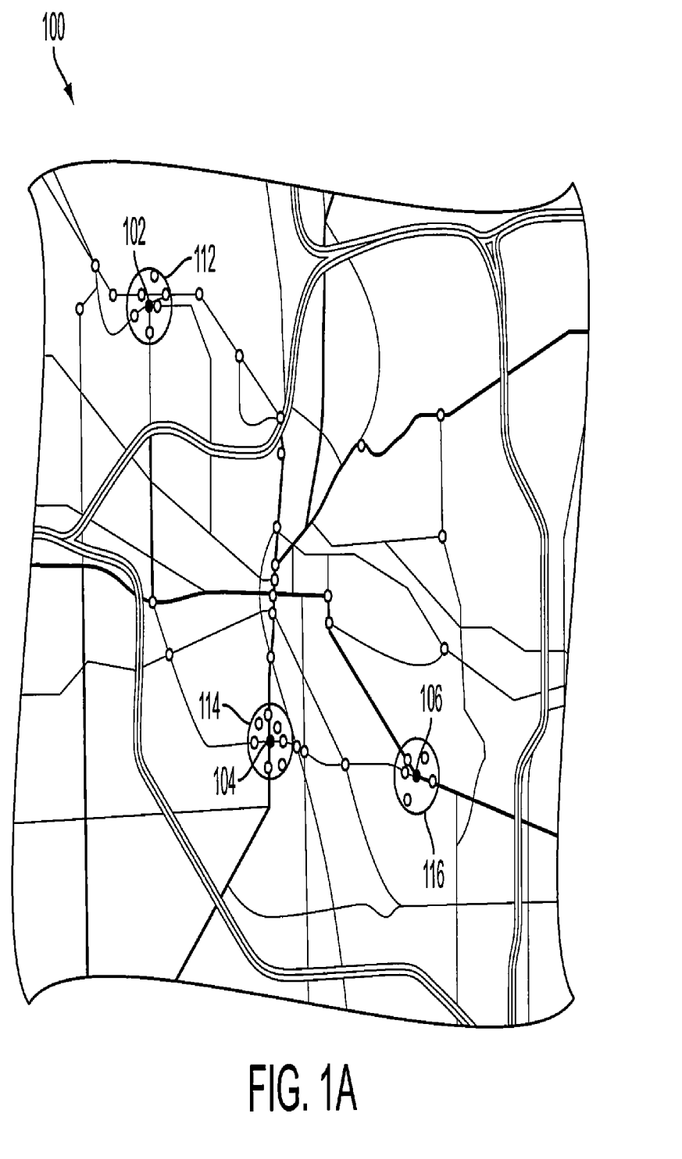
FIGS. 1A and 1B show a scenario in which an example scrubbing process may be implemented.
Figure 1B:
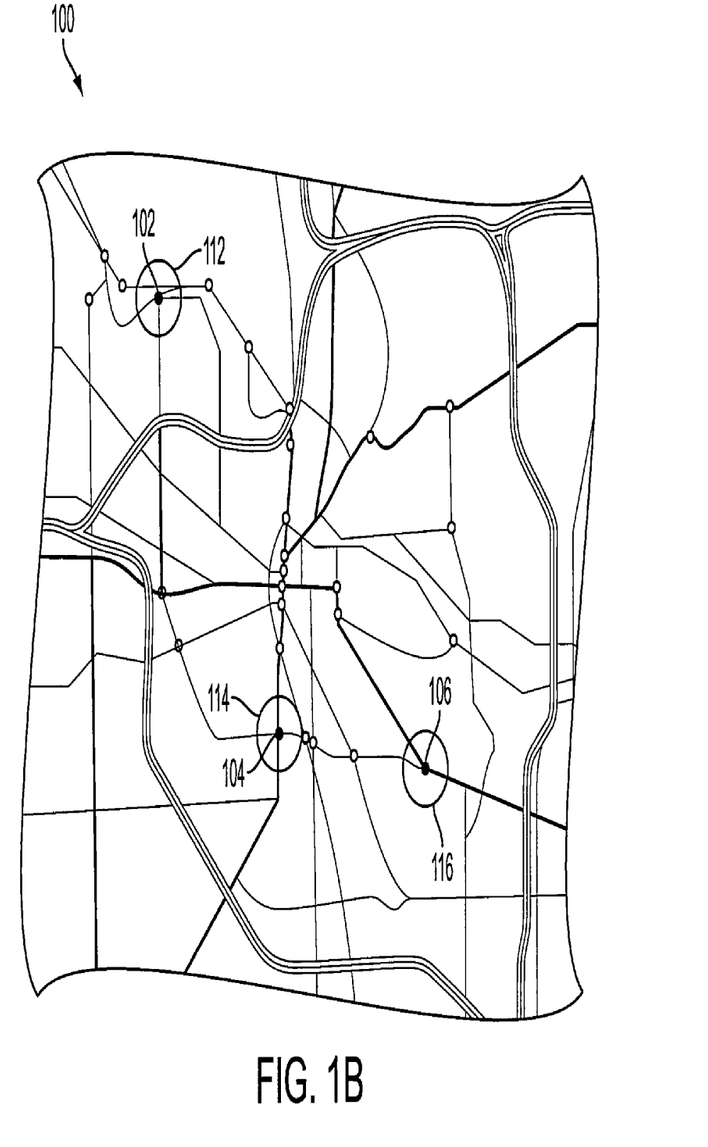

To illustrate, consider FIGS. 1A and 1B, which show a scenario in which an example scrubbing process may be implemented. In particular, FIG. 1A shows a map 100 with dots at the locations indicated by the location history of a given client ID, before an example scrubbing process is applied. The map 100 also shows the locations that, if known, might help to identify the individual user of the client device that provided the location reports. Specifically, map 100 shows the location of the user's home 102, the location of the user's work 104, and the location of the user's favorite lunch spot 106. (Note that the location reports typically won't associate a particular location as being a home location, or as being a work location, and so on; this information is included in FIGS. 1A and 1B for purposes of illustration.)

Since a user may spend more time at their home 102, work 104, and favorite lunch spot 106, the location history associated with their device's client ID may include clusters of location reports around such locations. For instance, in the scenario shown in FIG. 1A, the density of location reports in an area 112 around the user's home 102 is significantly higher than in other areas of the map. Similarly, there is a significantly higher density of location reports in the areas 114 and 116 near the user's work 104 and favorite lunch spot 106.

It is conceivable that clusters of location reports, which occur when a user stops at one location for some period of time, could be used to help determine the identity of the user whose device provided the location reports. However, it is typically desirable to protect a user's identity, unless the user has explicitly allowed their identity or user-account to be linked to the location data reported by their device. Accordingly, example embodiments may help to "scrub" around stops in a location history in an effort to remove or obscure some or all location reports near locations where a device is deemed to have stopped.

For instance, FIG. 1B shows dots on map 100 at the locations indicated by the location history shown FIG. 1A, after an example scrubbing process has been applied to the location history. The example scrubbing process may be applied to remove or obscure location reports at or near locations where there is a stop in the location history, such as in the areas 112, 114, and 116. Thus, as shown, the scrubbed location history no longer includes clusters of location reports in areas 112, 114, and 116, which are near the user's home 102, work 104, and favorite lunch spot 106. (Note that example scrubbing techniques, which may help to provide a scrubbed location history, such as that shown in FIG. 1B, will be described in greater detail in section III below.)

II. Illustrative Systems for Location-Data Aggregation and Storage

Systems and devices in which example embodiments may be implemented will now be described in greater detail. In general, an example system may be implemented in or may take the form of a computing system or systems, such as a server system. Further, an example system may take the form of a non-transitory computer readable medium, which has program instructions stored thereon that are executable by at a processor to provide the functionality described herein. An example system may also take the form of a computing system or device that includes such a non-transitory computer readable medium, and possibly includes other components as well.

Figure 2:
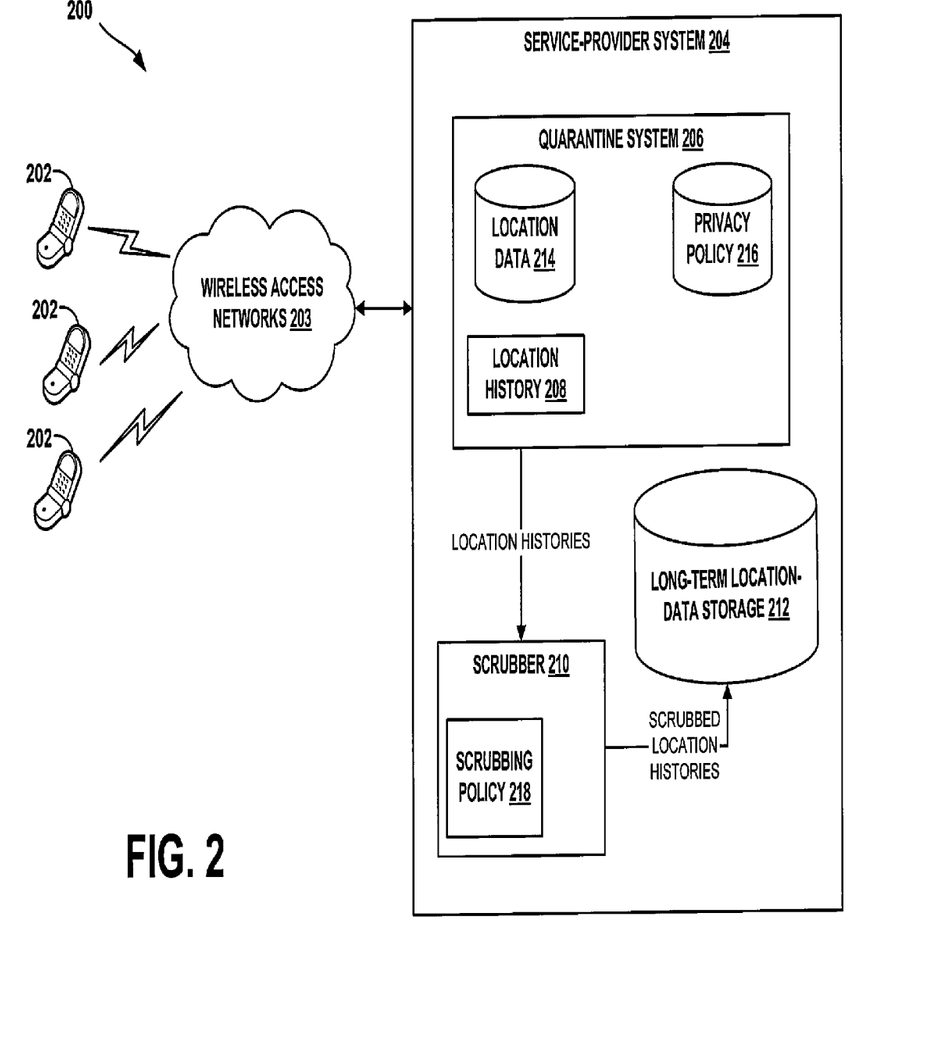
FIG. 2 is a simplified block diagram illustrating a network architecture in which an example embodiment may be implemented.

FIG. 2 is a simplified block diagram illustrating a network architecture 200 in which an example embodiment may be implemented. As shown, mobile devices 202 (e.g., client devices or user equipment) may communicate with a service-provider system 204 via one or more wireless networks 203 (and possibly via one or more other wired and/or wireless networks (not shown)). The service-provider system 204 includes a quarantine system 206, a location history module 208, a scrubber module 210, and long-term location data storage 212.

The mobile devices 202 may be configured to send location reports to the service-provider system 204. Accordingly, an example service-provider system 204 may include a communication interface (not shown) via which it can receive location reports that are generated by client devices 202. In an example embodiment, a given mobile device 202 may be configured to send location reports periodically or from time to time. A mobile device 202 could also send a location report upon request.

Location reports may include various types of data. In an example embodiment, each location report from a given mobile device 202 includes at least (a) the client ID of the mobile device 202 and (b) location data that indicates a location of the mobile device 202 at or near the time when the location report is generated. Each location report may also include a timestamp that indicates the time that corresponds to the location data. Alternatively, a timestamp may be associated with the location report and/or location data included therein by the service-provider system 204. Further, location reports may include other types of data, such as data that is indicative of the state of the mobile device 202 and sensor data acquired by the mobile device 202, among other possibilities.

When a service-provider system 204 receives location reports, the location reports may initially be stored by quarantine system 206 (e.g., in location-data storage 214). Quarantine system 206 may provide for initial, short-term storage, of location data. For example, quarantine system 206 may be configured to store a given location report for up to a maximum storage period (e.g., 7 days) after receipt of the location report.

In a further aspect, access to the quarantine system may be restricted in accordance with a privacy policy 216. Various types of privacy policies are possible, depending upon the particular implementation. Generally, a privacy policy may include a set of one or more policies or rules for use of location data and/or may place restrictions on access to location data, in an effort to prevent the location data from being leaked to an outside party or otherwise used in an undesirable manner.

Further, a location history module 208 may be configured to generate individual location histories for a number of client IDs, from the location data stored in quarantine system 206. In an example embodiment, the location history for a given client ID may include a sequence of location data points indicated by location reports associated with the client ID, which are organized in a time-wise manner. Accordingly, the location history module 208 may process incoming location reports and/or data in location data storage 214 to identify location histories on a per-client-ID basis. As such, some or all of the location data that is stored in location data storage 214 may be organized into per-client-ID location histories.

To help protect user identity when location data is exported from quarantine, where it may be more accessible than while in quarantine, scrubber module 210 may be configured to "scrub" location data before it is exported from quarantine system 206 to long-term location data storage 212. To do so, scrubber module 210 may implement a scrubbing policy 218, which provides one or more policies or rules for removing or obscuring some location reports from a given location history. In an example embodiment, scrubbing policy 218 may include one or more policies for obscuring or removing location reports at or near stops in location histories.

In some embodiments, location-history module 208 may facilitate the scrubbing process by labeling each location report in a given client ID's location history as either "stopped" or "moving." For example, when location-history module 208 generates the location history for a given client ID, the location-history module 208 may analyze the location reports and classify each location report as corresponding to either a stopped state or a moving state (e.g., where the reporting device is believed to have been either stopped or moving). The location history may thus include such state information for each location report included therein.

For instance, if a device moves less than a threshold distance from a given location in a certain period of time (e.g., ten minutes), then the device may be considered to be stopped, and the location report that indicated the given location may be associated with a stopped state. Further, in some embodiments, location reports may include velocity data indicating the velocity of the device at the time of the location report. In such an embodiment, the location-history module may additionally or alternatively use the velocity data to associate location reports with either the stopped state or the moving state.

In an example embodiment, scrubbing policy 218 may specify criteria related to the stopped or moving state, which can be applied to obscure stops that occur in a given location history. Therefore, provided with an indication as to whether each location report in a location history is associated with a stopped or moving state, scrubber module 210 may apply scrubbing policy 218 to detect any stops in a given location history. For example, scrubbing policy 218 may specify that a stop exists whenever location reports indicate a substantial lack of movement over a predetermined period of time (e.g., moving less than a threshold distance in a certain time period), and/or whenever a certain number of consecutive location reports indicate a substantial lack of movement by the reporting device.

When the scrubber module 210 detects a stop, the scrubber module 210 may scrub the location history to obscure or remove one or more location reports from the location history at or near the stop in the location history. Once a location history has been scrubbed according to scrubbing policy 218, the scrubbed location histories may be stored in long-term location-data storage 212. Long-term location-data storage 212 may be configured to store data for months, years, or possibly even on a permanent basis.

In a further aspect, the scrubber module 210 (or possibly another module) may also remove other information from a location history, before the location history is exported to long-term location-data storage 212. For example, to the extent the location history includes a quarantine row key, opted-out WiFi MACs, and/or SSIDs, such data may be removed before storing the scrubbed location history in long-term location-data storage 212. More generally, examples of data that might be removed include: (a) metadata that might potentially be used to link location reports together and is not otherwise useful post-quarantine (e.g. client IDs), (b) information that can't be kept beyond the quarantine period (e.g., Wifi opt-outs), (c) personally-identifiable information (PII) or information that might suggest PII (e.g., SSID), among other possibilities.

In some embodiments, the location data in long-term location-data storage 212 may effectively provide a point cloud of location reports, which does not specify which device provided a location report at any particular point. Note that in such an embodiment, the association between the location data in long-term location-data storage 212 and specific devices from which the location data is received may be lost or at least reduced significantly.

In some embodiments, the location data in long-term location-data storage 212 be organized into "tracks." Each track may include a sequence of location reports corresponding to travel from a first location to a second location (e.g., between two stops in the location history for a device). In such an embodiment, the location data in long-term location-data storage 212 may be organized by tracks (e.g., all points reported by a device within a certain period of time and/or between two points where the device came to a stop), where it is known that each track came from the same device, but where the particular device that is associated with each track is not identified (or in other words, where it is not determinable that two tracks came from the same device).

Wireless access networks 203 may take on various forms. Further, wireless access networks 203 may be connected to service-provider system 204 via one or more other wired and/or wireless networks. Further, devices may use various air-interface protocols to communicate via wireless access networks 203. For example, communications may be conducted using one or more of various different RF air-interface protocols, such as IEEE 802.11 (including any of the IEEE 802.11 revisions), various cellular protocols such as GSM, CDMA, UMTS, EV-DO, WiMAX, and/or LTE, and/or one or more proprietary protocols, among other possibilities.

III. Example Scrubbing Processes

Figure 3:
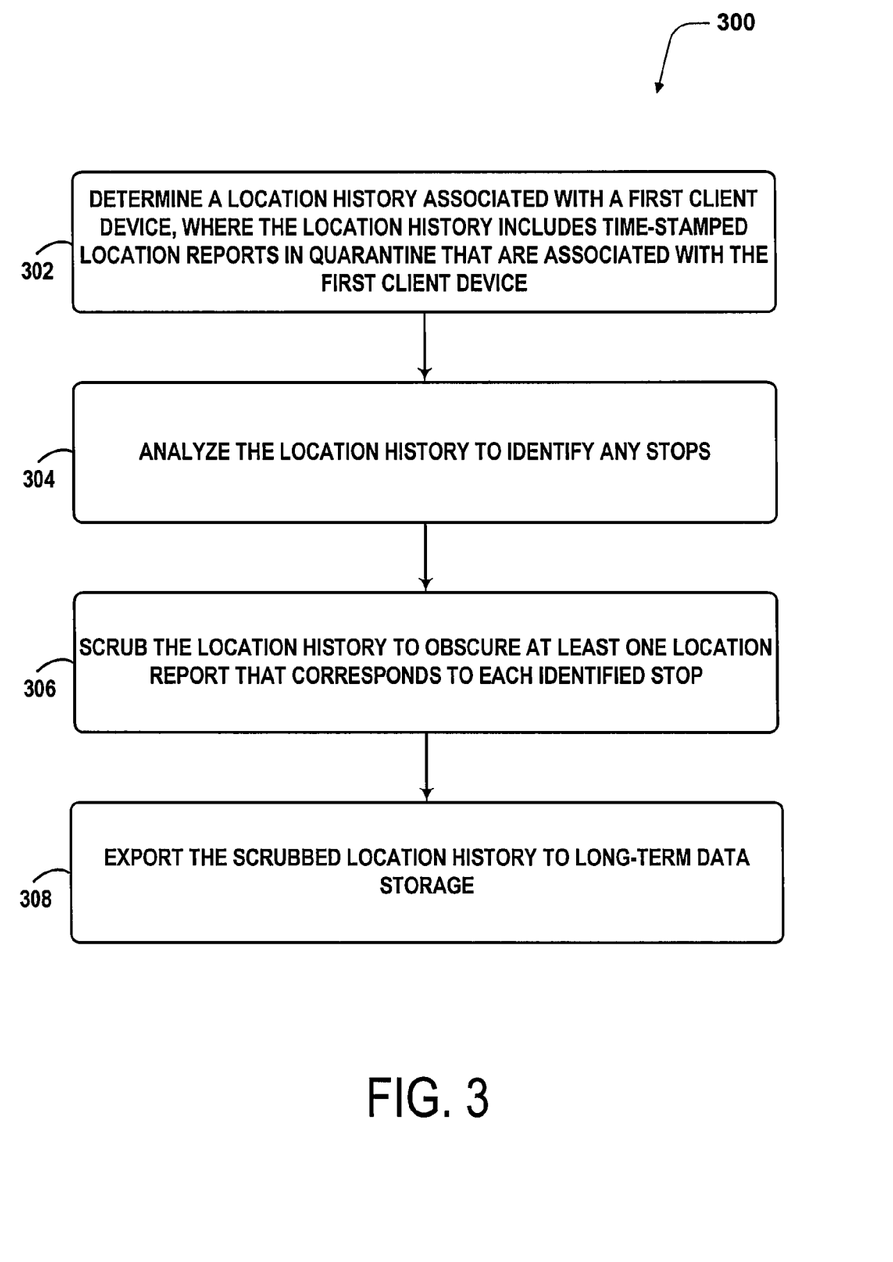
FIG. 3 is a flow chart illustrating a method, according to an example embodiment.

FIG. 3 is a flow chart illustrating a method 300, according to an example embodiment. In particular, method 300 may be implemented to help protect the identities of users of devices that report location data to a service provider and/or implemented for other purposes. Method 300 may be implemented in a system such as the service-provider system 204 shown in FIG. 2, and by other types of computing systems.

As shown by block 302, method 300 involves a computing system determining a location history associated with a first client device, where the location history includes the time-stamped location reports associated with the first client device. The location history may be determined while the location reports are stored in a quarantine system. Further, before the location history is exported (e.g., to long-term storage), the computing system may detect any stops in the location history, as shown by block 304 In an example embodiment, each stop corresponds to a threshold number of consecutive location reports that indicate a substantial lack of movement by the first client device. The computing system may then scrub the location history to obscure at least one location report that corresponds to a stop that is detected in the location history, as shown by block 306. The computing system may then export the scrubbed location history to long-term data storage, as shown by block 308.

In an example embodiment, location data may be periodically scrubbed and exported from a quarantine system to long-term location-data storage. Accordingly, method 300 or portions thereof may be repeated each time location data is scrubbed and exported to long-term data storage. For example, an example method such as method 300 may be used to scrub and export location data every seven days. Other examples are also possible.

A. Determining the Location History

At block 302, the function of determining the location history associated with a first client device may involve a computing system identifying all the location reports in quarantine that are associated with the same device (e.g., that have the same Client_ID). Alternatively, block 302 may involve identifying all the location reports in quarantine that are associated with the same device and have a timestamp during a certain period of time (e.g., all location reports that were received five or more days ago).

Further, to facilitate the detection of stops in a location history, each location report may be classified as either moving or stopped. In some embodiments, the distance between each location report in the location history and subsequent reports may be evaluated in order to classify location reports as stopped or moving. Note that such classification may be considered to be part of determining the location history at block 302, part of analyzing the location history at block 304, or part of a separate process altogether.

B. Classifying Location Reports as Stopped or Moving

Figure 4:
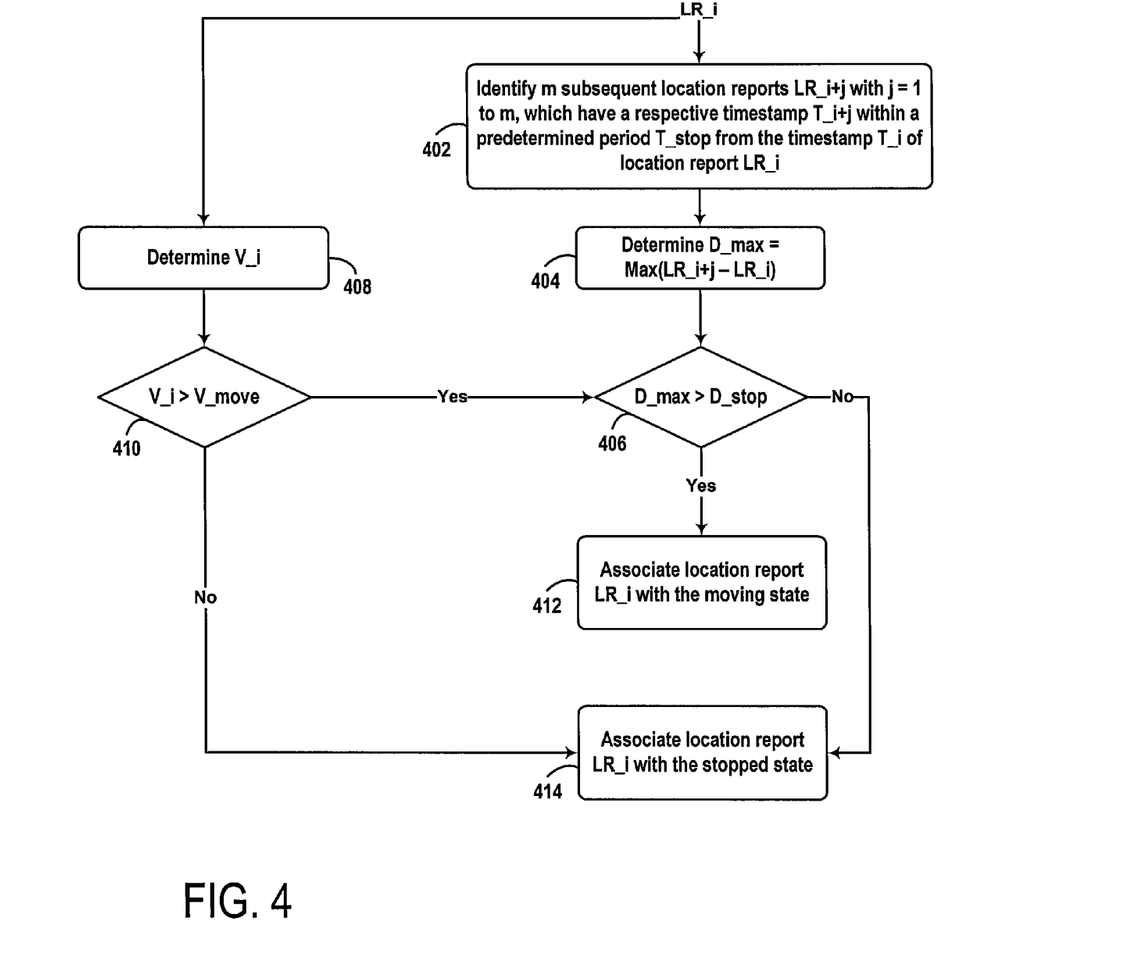
FIG. 4 is a flow chart illustrating a method for classifying location reports as stopped or moving, according an example embodiment.

FIG. 4 is a flow chart illustrating a method 400 for classifying location reports as stopped or moving, according to one example. A location-history module may implement method 400 to determine whether to associate each location report in a location history with either the stopped state or moving state, based on distance to subsequent location reports and/or velocity data.

More specifically, for a given location report $LR\_i$ in the location history, with $i=1$ to $n$, the location-history module may identify m subsequent location reports $LR\_i+j$ in the location history, with $j=1$ to $m$, which have a respective timestamp $T\_i+j$ that is within a predetermined period of time $T\_stop$ from the timestamp $T\_i$ of the given location report $LR\_i$, as shown by block 402. Note that $T\_stop$ may be defined as indicating the minimum amount of time that a device must spend at one place to be considered "stopped," or may be defined in another manner.

The location-history module may also determine a maximum distance ($D\_max$) between the location indicated by the given location report $LR\_i$ and the locations indicated by subsequent location reports $LR\_i+j$, as shown by block 404. In other words, at block 404, the location history module may determine the distance from the given location report $LR\_i$ to the furthest location report received with the time period $T\_stop$. The location-history module may then determine whether or not $D\_max$ is less than a threshold distance ($D\_stop$), as shown by block 406. Note that $D\_max$ and/or other distances described herein distance may be measured in a number of different ways. For example, a given distance may be calculated as a simple 3D distance, a distance along the earth (e.g., along on ellipsoidal model of the earth), or a distance along certain paths on a map (e.g., on roads, bike paths, or walking paths), among other possibilities.

In addition, the location-history module may determine the velocity ($V\_i$) associated with the given location report $LR\_i$, as shown by block 408. The location-history module may then determine whether $V\_i$ is less than a threshold velocity ($V\_move$), as shown by block 410. Then, if the maximum distance $D\_max$ is greater than the threshold distance $D\_stop$, and the velocity $V\_i$ is greater than the threshold $V\_move$, the location-history module may associate the given location report $LR\_i$ with the moving state, as shown by block 412. Otherwise, the location-history module may associate the given location report $LR\_i$ with the stopped state, as shown by block 414. Thus, by implementing method 400, the location-history module may determine the state association for the given location report $LR\_i$ as follows:

```
if (D_max > D_stop || V_i > V_move) {
    associate location report with moving state
} else {
    associate location report with stopped state
}
```

Method 400 may then be repeated for some or all location reports LR_i in the location history. By doing so, each location report LR_i may be associated with either a stopped or moving state.

Note that in some cases, there may be a location report in the location history for which the location cannot be determined. In such case, the location report may be classified as "unknown." Depending upon the particular scrubbing policy, an unknown location report may be scrubbed (e.g., removed) from the location history, copied over to long-term storage, or handled in another manner.

Further, note that the use of velocity is optional. As such, the location-history module may assign a stopped or moving state to each location report based only on whether D_max is greater than D_stop, or based on other criteria. Generally, it should be understood, that other techniques for associating location reports with a stopped or moving state are also possible. Such other techniques may be based on distance(s) to subsequent locations in a location history, velocity, and/or other factors.

In a further aspect, if a given location report includes activity classification data (e.g., data indicating activity recognition by the reporting device, such as "being still," "walking," "on a bike," "in a vehicle," etc.), then the location-history module may assign a stopped or moving state to the given location report based on such activity classification data. Note that a reporting device may use, e.g., an accelerometer to classify the device as still, walking, on a bike, in a vehicle, and so on.

C. Detecting Stops in a Location History

At block 304 of method 300, various techniques may be used to detect a stop in a given device's location history. In an example embodiment, a stop may be detected based on the motion states that are associated with the location reports in a given device's location history. As noted, the process of classifying each location report in a location history as moving or stopped, such as method 400 of FIG. 4, may be considered to be part of the function of detecting a stop at block 304, part of the function of determining the location history at block 302, or may be considered to be a separate function from blocks 302 and 304.

Once the location reports in a location history are classified as either stopped or moving, a scrubber module may use this state information to implement one or more scrubbing policies. In particular, the scrubber module may detect stops by identifying transitions in the location history, where consecutive location reports correspond to different states; e.g., where one of two consecutive location reports is associated with the stopped state and the second of the two consecutive location reports is associated with the moving state (or vice versa). The scrubber module may then scrub the location history by removing location report(s) from the location history that are within a predetermined distance from the stop location (e.g., the location indicated at a transition) and/or that have a timestamp within a certain period of time from the stop location.

In a further aspect of some embodiments, if location reports from a given device include activity classification data (e.g., "being still," "walking," "on a bike," "in a vehicle," etc.), then transitions in activity classification may be used as an additional or alternative basis for detecting stops in the device's location history. For example, detection of a stop may be based on the detection of a transition from one activity classification to another in two consecutive location reports (e.g., from "in vehicle" to "walking"). Other examples are possible.

Figure 5:
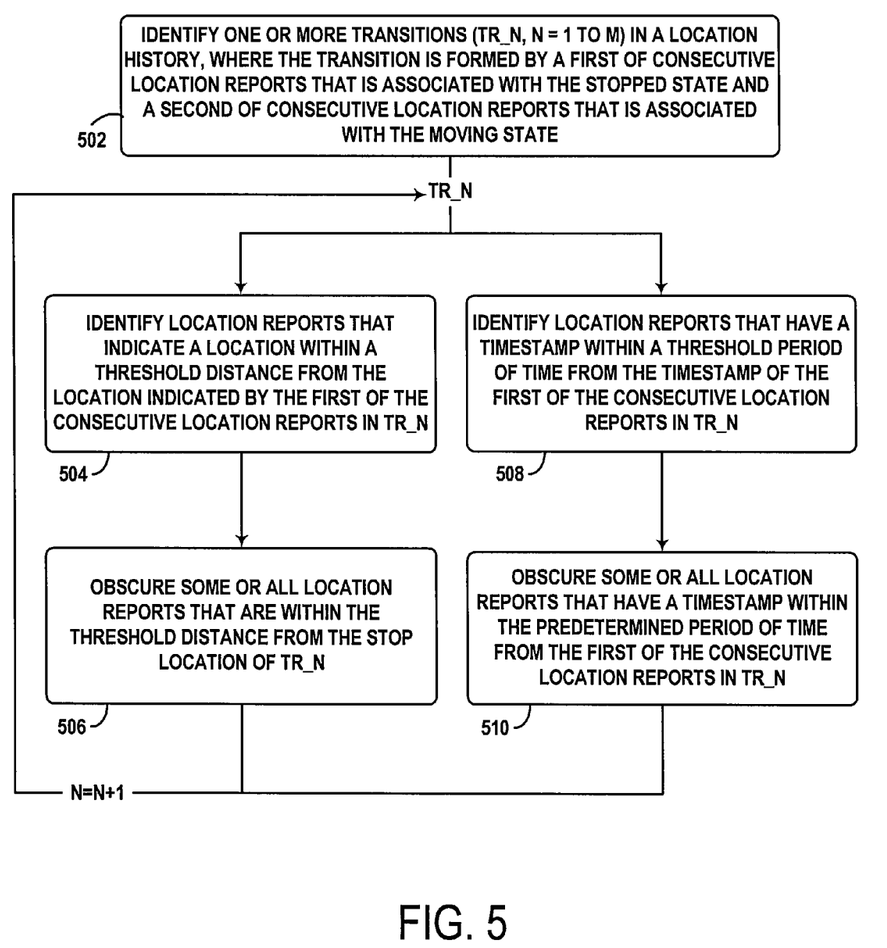
FIG. 5 is a flow chart illustrating a method for scrubbing around transitions in a location history, according to an example embodiment.

FIG. 5 is a flow chart illustrating a method 500 for scrubbing around transitions in a location history, according to an example embodiment. In particular, a scrubber module may identify one or more transitions in the location history of a given device, where each transition is formed by consecutive location reports in the location history that correspond to different states, with a first of the consecutive location reports being associated with the stopped state and a second of the consecutive location reports being associated with the moving state, as shown by block 502.

The scrubber module may then scrub the location history based at least in part on any transitions that are detected in the location history. In particular, the scrubber module may identify location reports that indicate a location within a threshold distance from the location indicated by the first of the consecutive location reports (which may be considered a stop location), as shown by block 504. The scrubber module may then obscure some or all location reports that are within the threshold distance from the stop location (e.g., by removing such reports from the location history), as shown by block 506.

Further, the scrubber module may identify location reports from a given device that have a timestamp within a threshold period of time from the timestamp of the first of the consecutive location reports, as shown by block 508. The scrubber module may then obscure some or all location reports that have a timestamp within the predetermined period of time from the first of the consecutive location reports, as shown by block 510.

In an example implementation of method 500, the scrubber module may identify location reports that indicate a location within a threshold distance (D_random) from a transition in the location history. D_random is thus a radius that defines an area around a transition in the location history, where location reports may be removed from the location history in order to obscure a stop. Note that use of D_random may help to obscure the amount of scrubbing that is done, and thus may help to prevent the estimation of a stop location via use of a specific scrubbing distance.

Further, in an example implementation, the scrubber module may vary the scrubbing process by dynamically determining D_random. For instance, the scrubber module may set a scrub parameter (D_scrub) according to the spatial privacy risk that is associated with a given location or area. (Note that spatial privacy risk is explained in greater detail below.) Depending on the amount of spatial privacy risk, D_scrub may be set to either D_scrub_low or D_scrub_high. D_scrub_low or D_scrub_high may be a predetermined maximum scrub distance for areas of low spatial privacy risk (e.g., 250 meters), D_scrub_high may be a predetermined maximum scrub distance for areas of high spatial privacy risk (e.g., 1000 m). The distance used to scrub around the given stop location may then be determined as follows:

$$D\_random = 0.5 * D\_stop + 0.5 * random(D\_scrub)$$

Additionally or alternatively, the scrubber module may identify location reports having a timestamp within a predetermined period of time (+/−T_random) from the time associated with the transition), and obscure or remove such reports from the location history. Further, in an example embodiment, the scrubber module may vary the scrubbing process by dynamically determining T_random. For instance, a time period T_lost may be defined. The scrubber module may then determine a value of T_random that is used to scrub around the time of a particular transition, as follows:

$$T\_random \text{ is } 0.5 * T\_lost + 0.5 * random(T\_lost)$$

Note that T_lost may specify the amount of time that a device may remain at the same location before it can no longer be reliability linked to the location history (e.g., one hour). As such, T_lost may be used to limit the period of time that is scrubbed once a stop in the location history is detected.

D. Implied-Stop Scrubbing Policy

In a further aspect, the scrubber module may implement an implied-stop scrubbing policy to scrub around implied stops. More specifically, the scenario where a transition is identified between the stopped and moving states in two consecutive location reports may be classified as an explicit stop that should be scrubbed around. However, implied stops may exist as well. Accordingly, an example scrubbing process may further involve detecting and scrubbing around implied stops.

As an example, the scrubber module may detect an implied stop at a location indicated by a moving location report, when the location history does not include any location reports within the period T_lost, either before or after the moving location report. The scrubbing module may then scrub around the implied stop in a location history in a similar manner as it scrubs around a transition in the location history.

E. Prolonged-Stop Scrubbing Policy

In a further aspect, a scrubber module may implement a prolonged stop policy. The prolonged stop policy may be applied to long contiguous sets of location reports that are associated with the stopped state. For example, the scrubber module may detect a prolonged stop in a location history when location reports are continually associated with the stopped state for at least a predetermined duration T_stop.

When a prolonged stop is detected in the location history, the scrubber module may obscure some or all location reports during the prolonged stop. For example, the location reports during a prolonged set may be divided into a number of time-based groups. More specifically, the time period including the prolonged stop, and extending beyond the prolonged stop by some amount, may be divided into a number of sub-periods that are each of the duration T_lost, and location reports may then be grouped according to these sub-periods. Further, the starting time of the first subperiod, which is typically some time before the prolonged stop began, may be selected randomly. The scrubber module may then keep one randomly-chosen location report from each group, and obscure (e.g., remove) all other location reports during the prolonged stop. Note, however, a location report that is selected to be kept may none-the-less be removed from the location history if it has a timestamp within the time period T_lost from a location report associated with the moving state.

F. Scrubbing Policy Based on Spatial Privacy Risk

As noted above, a scrubber module may vary the manner in which it scrubs a location history according to spatial privacy risk at a stop location that is being scrubbed. In particular, more-populated areas may have a lower privacy risk than less-populated areas, as the number of tracks in location data for a more-populated area may make it more difficult to identify any one particular track, as compared to a less-populated area. (Note that for purposes of this section a track may be considered a segment of a location history between two stops. As such, identification of a track may therefore identify stop location(s).)

Accordingly, a scrubber module (or another system) may determine an indicator of the spatial privacy risk at a stop location (e.g., at a transition or implied stop in a location history), and adjust the manner in which it scrubs around the stop location based on the measure of the spatial privacy risk. In an example embodiment, the density of location-data collection in an area may be used as an indicator of spatial privacy risk. Note that the density of location-data collection may be better indicator of spatial privacy risk than actual population density or other measures because it directly measures the amount of data confusion that may exist given the actual deployment of devices in the area.

To determine the density of location-data collection in an area, a computing system may determine the number of location reports received in the area during a certain period of time, divide the determined number by the size of the area to determine the density, and then compare the density to a threshold. If the density of location reports received in the area is above the threshold, then the area may be classified as having a low spatial privacy risk. On the other hand, if the number location reports received in the area is below the threshold, then the area may be classified as having a high spatial privacy risk.

In a further aspect, the threshold between high and low spatial-privacy risk may be determined based on the actual location-data reported throughout a network, and may be a percentage-based threshold. (Note that when a percentage-based threshold is used this may remove the need to change threshold setting when more devices are deployed in an area.) For example, a computing system may determine the respective density of location reports received in each of a number of cells within a larger area, during a given period of time. The threshold may then be set such that half of the cells are considered to have a high spatial privacy risk, and half of the cells considered to have a low spatial privacy risk. In other words, the cells may be classified such that the upper 50% of cells are classified as low-risk and the lower 50% of cells are classified as high-risk. For instance, over one week of data, the 50th percentile in location-data collections-per-cell may be 30 collections per day. Accordingly, any cell with fewer than 30 collections in that week may be considered to have a high privacy risk. Many other examples are of course possible.

Accordingly, an example method 300 may further involve determining the spatial privacy risk at a given stop location, and then adjusting the manner in which scrubbing is performed at the stop location based at least in part on the determined spatial privacy risk. For example, in high risk (i.e., "rural") areas, the scrubber module may increase the amount of scrubbing. For example, the scrubber module may increase the number of location reports that are removed, increase the radius of the area around the stop location that is scrubbed, and/or increase the time period before and/or after the timestamp of the stop location that is scrubbed.

In an example embodiment, scrubbing may be adjusted by setting a spatial-privacy parameter that is used to determine spatial and/or time-based scrubbing around a stop location. For instance, as noted above, the scrubber module may calculate a distance to scrub around a given stop location as: $D\_random = 0.5 * D\_stop + 0.5 * random(D\_scrub)$. As further noted, D_scrub may be set to either D_scrub_low or D_scrub_high, depending on whether there is a low or high spatial privacy risk at the stop location.

To provide a specific example of how D_scrub_low and/or D_scrub_high may be set, consider that rural areas may often be determined to have high spatial privacy risk, while urban areas may often be determined to have low spatial privacy risk. Now consider that the average size of a small family farm in the US (e.g., a rural property size) may be approximately 250 acres. Thus, if the assumption is made that such a small family farm is square, the border of the property would be on the order of 1000 meters on each side. If D_random for a location with high spatial privacy risk is between 500 and 1000 meters, as this may satisfactorily confuse the origin of a track ending at and/or starting from the rural property. In particular, there will be a circular area with a radius of at least 500 m attached to the first location report that is not scrubbed, and the spatial relationship of the first unscrubbed location report will be unknown. As a result, the stop location (e.g., at the rural home) may lie anywhere within 1000 m of the first unscrubbed location report (and likely more, since the estimate of 1000 m is based on the assumption that the first unscrubbed location report was itself very close to being scrubbed).

With an estimated average property size of one thousand one square kilometer (i.e., 1000 meters on each side), a circle of radius 1000 m from the first unscrubbed location report is expected to touch at least five properties on average (the property it is located within, and one neighbor property in each direction), making it difficult to positively identify the particular rural home as being the origin of a track in the location history. Based on this scenario, D_scrub_high may be set at 1000 meters, so that D_random for a location with high spatial privacy risk will vary between 500 and 1000 meters, and thus help to obscure the origin and/or end of tracks in the location history, which occur at the rural home. Note that the above techniques settings for D_scrub_low and D_scrub_high are provided for illustrative purposes. Other techniques for setting D_scrub_low and/or D_scrub_high are also possible.

Further, it should be understood that the above settings and adjustments to the scrubbing process in view of spatial privacy risk are provided for illustrative purposes; other settings and adjustments are possible, depending upon the scenario. For example, based on the spatial privacy risk at a given stop location, a scrubber module could adjust the manner in which T_random is calculated for a given stop location (e.g., by varying T_lost). Other examples are also possible.

G. Scrubbing Policy Based on Location-Data Type

In a further aspect, note that the scrubber module may also vary the manner in which it scrubs around transitions and/or implied stops based on the type of location data that is provided at the stop location. For example, the scrubber module may vary the manner in which the scrubbing radius (e.g., D_random) and/or the scrubbing period (e.g., +/−T_random) are calculated based on whether the location report at the stop location includes GPS coordinates, a WiFi-based location, and/or a cell identifier. Other examples are also possible.

In a further aspect, note that illustrative scrubbing processes may be decoupled from the geometry of the location history (e.g., from the shape of the tracks in the location history). Instead, illustrative scrubbing processes typically utilize timestamps and motion classification to determine which location reports to scrub.

H. Scrubbing Policy to Account for Moving Bias

In practice, the distance computation between two location reports may be complicated by the presence of outliers and other poor and/or low-accuracy location reports within the location history for a given device. Such outlier location reports can create a bias towards the moving state, as they can incorrectly make it appear as if a device moved a large distance in a short period of time (e.g., between consecutive location reports). For example, when associating location reports in a location history with the stopped or moving state, an outlier may incorrectly cause the maximum distance D to be greater than the threshold distance D_stop, such that a location report is incorrectly classified as moving.

In one aspect, a scrubber module may implement a scrubbing policy that removes outlying location reports by detecting "location jumps" in a location history. In an example embodiment, a location jump may detected when the scrubber module detects a distance between a given location report and a subsequent location report within T_stop from the given location report, which cannot be explained by a combination of inaccuracy and travel at a maximal travel speed (e.g., Mach 1). When such a location jump is detected between the location report being evaluated and a subsequent location report, the subsequent location report may be discarded.

In a further aspect, an example scrubber module may implement a scrubbing policy that removes inaccurate location reports that fall short of causing a location jump. For example, a scrubbing policy may require that, in order for a given location report to be associated with the moving state, there must be some location report within the T_stop period from the given location report that has an accuracy circle that is separate from the given location reports accuracy circle by at least D_stop. (Note that the accuracy circle for a given location report may be a circle that is centered on the location report and has a radius corresponding to the accuracy of location indicated by the location report.)

I. Time Alignment

In a further aspect, a service-provider system may analyze timing information included in location reports or before scrubbing a location history, and possibly before storing the location reports in quarantine in the first place. In either case, the service-provider system may adjust or change the timestamp on a given location In practice, timestamps on location reports may be inaccurate for various reasons. Accordingly, an example location module (or another component of a service-provider system) may apply a time-alignment process to location reports that are received form client devices before scrubbing a location history, and possibly before storing the location reports in quarantine in the first place. To do so, a service-provider system may analyze the timing information that is included in each location reports (if any), and adjust or change the timestamp of a given location report if the included timing information is deemed to be inaccurate or unreliable.

In an example embodiment, there are three primary sources of timing information relating to location reports. First, the service-provider system may use its system clock to determine the time at which a given location report is received by the system. This timing information may be assumed to be accurate to within minutes of the actual time the device is at the indicated location. Second, a location report may include a GPS timestamp (e.g., a time obtained by the client device from a GPS signal). Such a GPS timestamp is generally the most accurate source of timing information, but can occasionally be very inaccurate (e.g., on the order of weeks or years). Third, a location report may include a timestamp based on the device clock of the client device. A location report typically includes a timestamp based on the device clock when the report indicates a WiFi- or cell-based location, instead of a GPS location. Device-clock based timing information typically is accurate relative to other location reports from the same device, but can be arbitrarily inaccurate as compared to the actual time (e.g., when the time indicated by the device clock is behind or ahead of the actual time).

In view of the foregoing, if a location report indicates a GPS-based timestamp, and includes a timestamp that is consistent with the time of receipt indicated with the server clock (e.g., within 20 minutes, give or take), the service-provider system may trust that the GPS timestamp is correct.

Further, when a client device has access to GPS signal, the device may determine a device-clock-to-GPS-clock offset, which may be included in the device's location reports. Therefore, in the event that a location report with a GPS timestamp also includes WiFi and/or cellular location information, the service-provider system may use the device-clock-to-GPS-clock offset to derive the real time of a WiFi and/or cellular scan that produced the indicated WiFi and/or cellular location information.

Yet further, if a location report does not include a GPS timestamp, the service-provider system may assume that the time indicated by the server clock corresponds to the most recent device-clock timestamp in received location reports, and convert all the timestamps in the request accordingly.

IV. Illustrative Computing Devices

Figure 6:
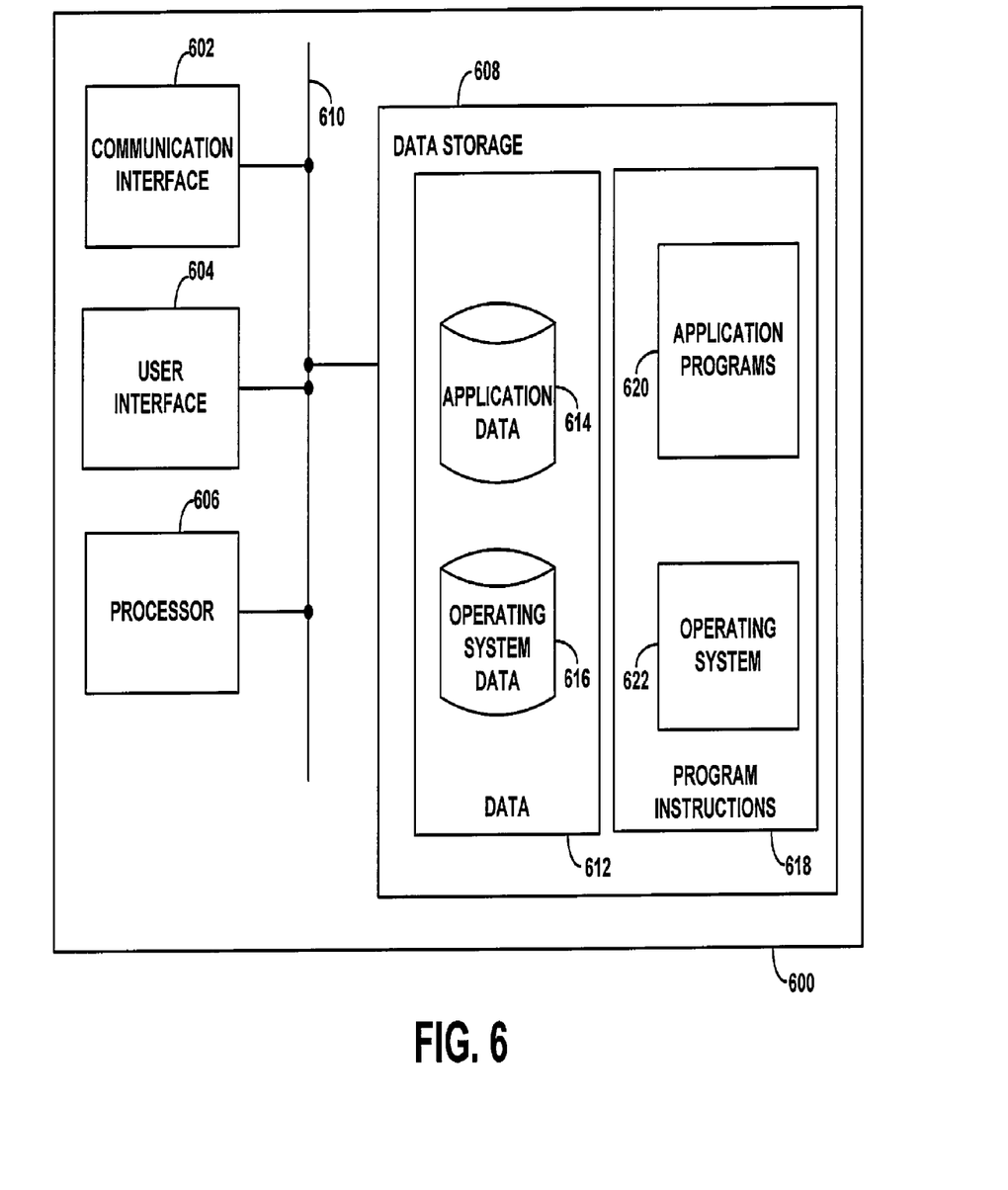
FIG. 6 is a simplified block diagram showing some of the components of a computing device that may be utilized in example embodiments.

Various systems and methods described herein may take the form of or be implemented using one or more computing devices. For purposes of example, FIG. 6 is a simplified block diagram showing some of the components of a computing device 600 that may be utilized in example embodiments. It should be understood that not all of the illustrated components shown in FIG. 6 are required. Further, a computing device may include components that are not shown in FIG. 6.

As shown in FIG. 6, computing device 600 may include a communication interface 602, a user interface 604, a processor 606, data storage 608, and camera components 624, all of which may be communicatively linked together by a system bus, network, or other connection mechanism 610.

Communication interface 602 may function to allow computing device 600 to communicate, using analog or digital modulation, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface).

User interface 604 may function to allow computing device 600 to interact with a human or non-human user, such as to receive input from a user and to provide output to the user. Thus, user interface 604 may include input components such as a keypad, keyboard, touch-sensitive or presence-sensitive panel, computer mouse, trackball, joystick, microphone, and so on. User interface 604 may also include one or more output components such as a display screen which, for example, may be combined with a presence-sensitive panel. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

In some embodiments, user interface 604 may include a display that serves as a viewfinder for still camera and/or video camera functions supported by computing device 600. Additionally, user interface 604 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 606 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or functions disclosed in this specification and/or the accompanying drawings. The execution of program instructions 618 by processor 606 may result in processor 606 using data 612.

By way of example, program instructions 618 may include an operating system 622 (e.g., an operating system kernel, device driver(s), and/or other modules) and one or more application programs 620 (e.g., camera functions, address book, email, web browsing, social networking, and/or gaming applications) installed on computing device 600. Similarly, data 612 may include operating system data 616 and application data 614. Operating system data 616 may be accessible primarily to operating system 622, and application data 614 may be accessible primarily to one or more of application programs 620. Application data 614 may be arranged in a file system that is visible to or hidden from a user of computing device 600.

Application programs 620 may communicate with operating system 622 through one or more application programming interfaces (APIs). These APIs may facilitate, for instance, application programs 620 reading and/or writing application data 614, transmitting or receiving information via communication interface 602, receiving and/or displaying information on user interface 604, and so on.

In some vernaculars, application programs 620 may be referred to as "apps" for short. Additionally, application programs 620 may be downloadable to computing device 600 through one or more online application stores or application markets. However, application programs can also be installed on computing device 600 in other ways, such as via a web browser or through a physical interface (e.g., a USB port) on computing device 600.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

Moreover, a block that represents one or more information transmissions may correspond to information transmissions between software and/or hardware modules in the same physical device. However, other information transmissions may be between software modules and/or hardware modules in different physical devices Note that to the extent any systems or methods discussed herein may collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A method comprising:

determining, by a computing device, a location history associated with a first client device, wherein the location history comprises a plurality of time-stamped location reports associated with the first client device;

before the location history is exported to long-term data storage, the computing device:

(i) analyzing the location history to detect one or more types of identification information, and removing or obscuring detected identification information from the location history; and (ii) scrubbing at least one stop from the location history, wherein scrubbing the at least one stop comprises:

(a) analyzing the location history to detect stops in the location history, wherein a stop comprises a plurality of location reports that indicate a substantial lack of movement by the first client device; and (b) scrubbing the location history in order to obscure at least one location report that corresponds to the at least one stop; and exporting the scrubbed location history to long-term data storage.

2. The method of claim 1, wherein each location report associated with the first client device comprises: (a) a client-device identifier of the first client device and (b) location data indicative of a location of the first client device at a time of the location report.

3. The method of claim 1, wherein one or more of the location reports each comprise one or more of: (a) GPS location data, (b) WiFi-based location data, and (c) cell-based location data.

4. The method of claim 1, wherein scrubbing the at least one stop from the location history comprises:

determining one or more subsequent location reports in the location history having a timestamp within a predetermined period of time from the timestamp for the location report;

determining a maximum distance between the location indicated by the location report and the one or more locations indicated by the one or more subsequent location reports;

determining whether or not the maximum distance is less than a threshold distance; and associating the location report with either a stopped state or a moving state, wherein the association is based at least in part on whether or not the maximum distance is less than the threshold distance.

5. The method of claim 4, wherein associating the location report with either the stopped state or the moving state comprises:
- if the maximum distance is less than the threshold distance, then associating the location report with the stopped state; and
- if the maximum distance is greater than the threshold distance, then associating the location report with the moving state.

6. The method of claim 4, further comprising:
- before associating the location report with either a stopped state or a moving state: (a) determining a velocity corresponding to the location report, and (b) determining whether or not the velocity is less than a threshold velocity;
- wherein associating the location report with either the stopped state or the moving state is further based on whether or not the velocity is less than the threshold velocity.

7. The method of claim 6, wherein associating the location report with either a stopped state or a moving state comprises:
- if (a) the maximum distance is greater than the threshold distance or (b) the velocity is greater than the threshold velocity, then associating the location report with the moving state; and
- otherwise, associating the location report with the stopped state.

8. The method of claim 1, wherein scrubbing the at least one stop from the location history comprises:
- determining a velocity corresponding to the location report;
- determining whether or not the velocity is less than a threshold velocity; and
- associating the location report with either a stopped state or a moving state, wherein the association is based at least in part on whether or not the velocity is less than the threshold velocity.

9. The method of claim 1, wherein each location report in the location history is associated with either a stopped state or a moving state, wherein scrubbing at least one stop from the comprises identifying one or more transitions in the location history, wherein each transition comprises consecutive location reports in the location history that correspond to different states, and wherein one of the consecutive location reports corresponds to the stopped state and another of the consecutive location reports corresponds to the moving state.

10. The method of claim 9, wherein scrubbing at least one stop from the location history comprises scrubbing the location history based at least in part on the one or more transitions in the location history.

11. The method of claim 10, wherein scrubbing the location history based at least in part on the one or more transitions comprises:
- determining one or more location reports that indicate a location within a threshold distance from a stop location indicated by a first of the consecutive location reports; and
- obscuring the one or more location reports that are within the threshold distance from the stop location.

12. The method of claim 10, wherein scrubbing the location history based at least in part on the one or more transitions comprises:
- determining one or more location reports that have a timestamp within a threshold period of time from the timestamp of a first of the consecutive location reports; and
- obscuring the one or more location reports that have a timestamp within the predetermined period of time from the timestamp of the first of the consecutive location reports.

13. The method of claim 1, wherein scrubbing at least one stop from the location history further comprises scrubbing the location history based at least in part on a measure of spatial privacy risk.

14. The method of claim 1, wherein scrubbing at least one stop from the location history further comprises adjusting parameters for scrubbing around each stop in the location history based on a type of location data included in a location report associated with the stop.

15. The method of claim 1, wherein scrubbing at least one stop from the location history further comprises:
- analyzing the location history to detect any location jumps in the location history; and
- scrubbing one or more location reports that are associated with each detected location jump.

16. The method of claim 1, further comprising initially applying a time-alignment process to the location reports in the location history.

17. The method of claim 1, wherein the location history is stored in short-term data storage before being exported, the method further comprising:
- after exporting the scrubbed location history, deleting the location history from the short-term data storage.

18. The method of claim 1, wherein the short-term data storage is part of a quarantine system for location data.

19. A non-transitory computer readable medium having stored therein instructions executable by a computing device to cause the computing device to perform functions comprising:
- determining, by a computing device, a location history associated with a first client device, wherein the location history comprises a plurality of time-stamped location reports associated with the first client device;
- before the location history is exported to long-term data storage, the computing device:
  (i) analyzing the location history to detect one or more types of identification information, and removing or obscuring detected identification information from the location history; and
  (ii) scrubbing at least one stop from the location history, wherein scrubbing the at least one stop comprises:
    (a) analyzing the location history to detect stops in the location history, wherein a stop comprises a plurality of location reports that indicate a substantial lack of movement by the first client device; and
    (b) scrubbing the location history in order to obscure at least one location report that corresponds to the at least one stop; and
- exporting the scrubbed location history to long-term data storage.

20. A system comprising:
- one or more communication interfaces, wherein at least one communication interface is configured to receive location reports that are generated by a plurality of client devices, wherein received location reports are initially stored in a quarantine system;
- a location-history module configured to determine, from the location reports stored in the quarantine system, a location history associated with a first client device, wherein the location history comprises a plurality of location reports that are associated with the first client device; and a scrubber module configured to: (i) analyze the location history to detect one or more types of identification information, and remove or obscure detected identification information from the location history, and (ii) scrub at least one stop from the location history;

wherein, in order to scrub the at least one stop, the scrubber module is configured to:

analyze the location history to detect stops in the location history, wherein a stop comprises a plurality of location reports that indicate a substantial lack of movement by the first client device; and scrub the location history in order to obscure at least one location report that corresponds to the at least one stop; and wherein at least one of the one or more communication interfaces is configured to export the scrubbed location history to long-term data storage.

\* \* \* \* \*